G. MILNE & W. H. GANTS.
Water-Closet.
No. 226,338. Patented April 6, 1880.
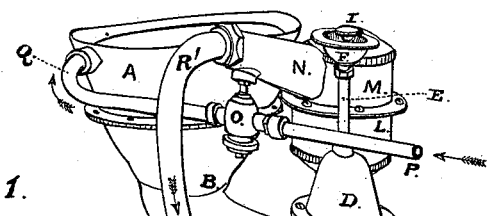
Fig. 1.
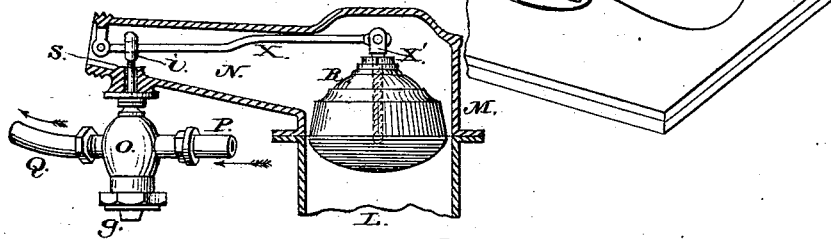
Fig. 3.
Fig. 2.
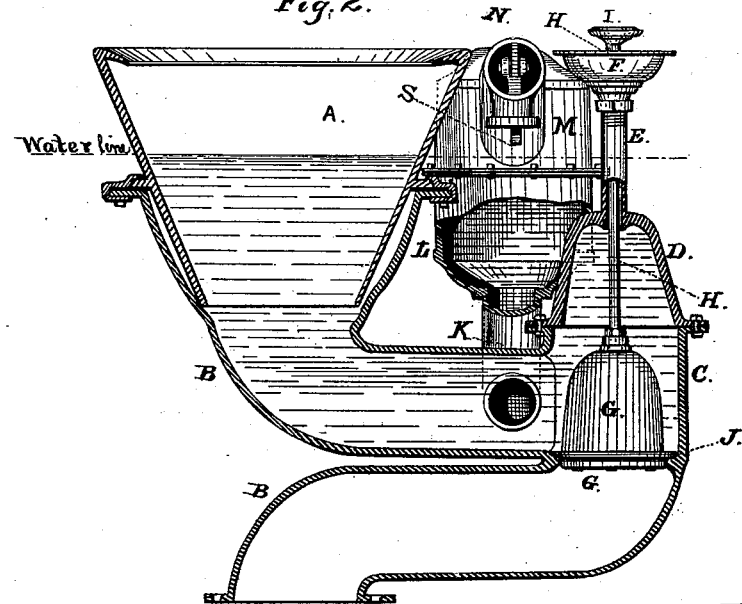
Witnesses:
Edward E. Osborn
Wm. H. Clark
Inventors:
George Milne & Wm. H. Gants
per Bonner & Osborn
Attys.

UNITED STATES PATENT OFFICE.

GEORGE MILNE AND WILLIAM H. GANTS, OF SAN FRANCISCO, CALIFORNIA.

WATER-CLOSET.

SPECIFICATION forming part of Letters Patent No. 226,338, dated April 6, 1880.

Application filed October 25, 1879.

*To all whom it may concern:*

Be it known that we, GEORGE MILNE and WILLIAM H. GANTS, of the city and county of San Francisco, in the State of California, have invented certain new and useful Improvements in Water-Closets; and we do hereby declare that the following is a full, clear, and exact description thereof, reference being had to the accompanying drawings.

Our invention has reference to that class of water-closets in which the water is admitted to the bowl by means of a float-valve and is discharged therefrom by a pull-valve, thus maintaining a standing body of water in the bowl except when it is being emptied.

Our invention consists of a float-valve and certain adjuncts connected to the supply-valve, and of certain combination of detailed parts, substantially as hereinafter more fully set forth.

Referring to the accompanying drawings, Figure 1 is a perspective view of our improved water-closet. Fig. 2 is a vertical longitudinal section through the center of the bowl, waste-pipe, and valve-chambers; and Fig. 3 is a vertical longitudinal section through the float-chamber and extension.

A is the bowl, and B is the waste-pipe, through which the contents of the bowl are discharged.

It will be noticed that we do not bend this waste-pipe so as to form an S-trap, as is usually done, but we make a double bend, as shown, the bottom of each bend being on a slight incline, so as to give an unobstructed flow or passage from the bowl.

The pull-valve we locate at the outer extremity of the bend, as follows: At the outer end of the bend we form a chamber, C, the top D of which projects above the bend and is removable. This top has a tube, E, projecting upward from the center of its upper end, which tube has a small cup or bowl, F, secured to its upper end. In the bottom of this chamber, and on a level with the flow or bottom of the upper bend of the waste-pipe, is the opening, which is closed by the valve, and which connects the upper part of the bend with the lower part.

The valve G is made solid, and its handle or stem H passes up through the tube E, and has a handle, I, on its upper end. An india-rubber ring or gasket, J, is secured around the lower edge of the valve, so as to make a tight joint when the valve is seated on the projecting rim around the opening.

The interior of the top D of the chamber is made to correspond with the shape of the valve, so that when the valve is drawn up into it the space will be occupied by the valve, and there will be no chance for anything to get behind it to clog its action. This also permits the valve to be lifted clear of the passage through the pipes, so that everything can pass freely through.

K is a short pipe, which projects upward from the side of the upper bend of the waste-pipe. To the upper end of this pipe the lower half of the chamber L, in which the float operates, is attached. The upper part, M, of this chamber has a tubular extension, N, projecting from it on one side, as shown. Near the outer end of this extension and on its under side is attached the valve-chamber O, through which the water from the main passes into the bowl A. The outer end of the extension M is connected by an overflow-pipe, R, with the lower bend of the waste-pipe below the valve G, as shown. P is the water-pipe, which connects this valve-chamber with the main or head, and Q is the pipe which leads from the opposite side of the chamber to the bowl.

The chamber L is but slightly larger in diameter than the float R that moves in it; but it is of sufficient length vertically to admit of the necessary rise and fall of the float. The float is suspended from the end of a lever, X, by means of a screw, X', which can be shortened or lengthened by turning it in or out, so as to adjust the position of the float with reference to the lever, and thus regulate the level of the water in the bowl. The opposite end of the lever is pivoted to a lug at the outer extremity of the tubular extension N, so that the rod passes through the extension and directly over the valve-chamber O. A hole is made leading from the extension-chamber N down into the valve-chamber, through which a rod or pin, S, passes, so that when it is pressed downward its lower end will strike the top of the ball and force it down from its seat. The upper end of this pin or spindle is connected with the lever X between its pivoted end and the end from which the weighted float is suspended, so that when the float-chamber is filled with water and the float is raised the pin will also be raised and the ball left free to close the opening; but when the water is discharged and the float falls the pin is pressed upon the ball, so as to force it away from the opening and allow the water to pass through until the bowl has filled again, and the float raised to its original position.

The pin or spindle S has a shoulder, $i$, near its upper end, below which is a washer, which makes a close joint when the pin is depressed. We also make a deep groove around the lower end of the pin, so as to reduce its size, but leaving the extreme end of the full size. This reduced portion takes up less space in the water-way, yet leaves a broad surface to press upon the valve.

The operation will then be as follows: When the valve G is down the water stands to the proper height in the bowl A, float-chamber L, upper part of the bend in the waste-pipe, and in the tube E above the valve. After the bowl has been used the user lifts the valve G by means of the handle I in the usual way, which draws the valve G up into the top of the valve-chamber clear of the passage through the waste-pipe. This allows the water and contents of the bowl to pass out freely through the waste-pipe and valve-opening. As the water in the float-chamber lowers the float drops down and causes the rod or pin S to press the ball-valve from its seat and admit water through the supply-pipe into the bowl. When the valve G is released it instantly closes and shuts off the outflow through the waste-pipe, after which the water will accumulate above the valve, so as to fill the upper bend of the waste-pipe bowl and float-chamber until the float is carried high enough to raise the pin free from the ball and allow it to close the water-passage from the main to the bowl. The point at which the pin frees itself from the closing ball-valve determines the height of the water in the bowl.

Any overflow from the float-chamber passes through the overflow-pipe R' into the second bend of the waste-pipe below the valve G, so that it is impossible for the water to rise higher than the overflow. The water will then stand on the same level in the bowl, float-chamber, and tube above the valve G, so that every passage through which foul gases from the sewer or waste-pipe might penetrate is sealed with water, and the closet thus positively trapped.

It will be impossible for the water to siphon off through the overflow-pipe, as any lowering of the water-level in the float-chamber opens the water-valve and the waste or loss is replenished.

We thus provide a simple and effective valve arrangement for discharging the water from the bowl and supplying the necessary amount for a fresh charge.

The arrangement is such that the operative parts can readily be got at for adjustment or repairs.

Having thus described our invention, what we claim, and desire to secure by Letters Patent, is—

1. The float-chamber L M, with its tubular extension N and overflow-pipe R', and connected with the upper bend of the waste-pipe by the short pipe K, in combination with the float R, suspended on a hinged lever, X, said float being arranged to operate the supply-valve, substantially as above specified.

2. The valve-chamber O, attached to the under side of the tubular extension N of the float-chamber, with its valve, in combination with the hinged lever X, float R, and presser-pin S, substantially as and for the purpose described.

3. The combination, with the bowl A, having the recurved waste-pipe B, of the chamber L M, having the extension N and overflow-pipe R', and connected with the upper bend of the waste-pipe by the pipe K, float R, and hinged lever X, substantially as and for the purpose set forth.

4. The combination, with the bowl A, having the recurved waste-pipe B and valve G, with its stem H and chamber D E, of the chamber L M, having the extension N, pipe R', valve-chamber O, float R, presser-pin S, lever X, and pipes K and Q, substantially as and for the purpose set forth.

In witness whereof we have hereunto set our hands and seals.

GEO. MILNE. [L. S.]
    WILLIAM H. GANTS. [L. S.]

Witnesses:
    WM. F. CLARK,
    EDWARD E. OSBORN.